United States Patent
Domino et al.

(10) Patent No.: US 6,529,712 B1
(45) Date of Patent: Mar. 4, 2003

(54) SYSTEM AND METHOD FOR AMPLIFYING A CELLULAR RADIO SIGNAL

(75) Inventors: William J. Domino, Yorba Linda, CA (US); Darioush Agahi-Kesheh, Irvine, CA (US); Dmitriy Rozenblit, Irvine, CA (US); Mark Oskowsky, San Jose, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/383,122

(22) Filed: Aug. 25, 1999

(51) Int. Cl.⁷ .................................................. H04Q 7/20
(52) U.S. Cl. ........................................ 455/86; 455/318
(58) Field of Search ............................. 455/226.1, 228, 455/319, 323, 325, 333, 85, 86, 127, 141, 151.3, 318, 338; 330/126, 137, 183, 200; 332/138, 139, 141, 177; 341/155, 140; 331/59, 177 R

(56) References Cited

U.S. PATENT DOCUMENTS

| | | | | |
|---|---|---|---|---|
| 3,585,577 A | * | 6/1971 | Rollwitz et al. | 367/90 |
| 3,705,385 A | * | 12/1972 | Batz | 340/870.02 |
| 3,715,687 A | * | 2/1973 | Solender | 331/179 |
| 3,758,865 A | * | 9/1973 | McKibben | 331/1 R |
| 4,190,808 A | * | 2/1980 | Fajen | 330/302 |
| 4,218,772 A | * | 8/1980 | Sielman et al. | 455/20 |
| 4,278,840 A | * | 7/1981 | Morgan et al. | 380/41 |
| 4,312,072 A | * | 1/1982 | Vogel | 375/322 |
| 4,355,404 A | * | 10/1982 | Uzunoglu | 331/117 R |
| 4,468,638 A | * | 8/1984 | Kyriakos | 331/178 |
| 4,501,019 A | * | 2/1985 | Matsukura et al. | 455/112 |
| 4,721,927 A | * | 1/1988 | Aota et al. | 332/130 |
| 4,931,799 A | * | 6/1990 | Wen et al. | 342/110 |
| 5,047,734 A | * | 9/1991 | Newell et al. | 331/105 |
| 5,123,048 A | * | 6/1992 | Miyamae et al. | 704/246 |
| 5,603,111 A | * | 2/1997 | Wyatt | 329/359 |
| 5,629,652 A | * | 5/1997 | Weiss | 331/108 B |
| 5,703,910 A | * | 12/1997 | Durvaux et al. | 375/322 |
| 5,982,834 A | * | 11/1999 | Drost et al. | 375/355 |
| 6,064,701 A | * | 5/2000 | Tresser et al. | 375/285 |
| 6,137,374 A | * | 10/2000 | Merrill | 331/158 |
| 6,195,400 B1 | * | 2/2001 | Maeda | 375/327 |
| 6,215,365 B1 | * | 4/2001 | Kurkovskiy | 331/65 |

* cited by examiner

*Primary Examiner*—Dwayne Bost
*Assistant Examiner*—Jean Gelin

(57) ABSTRACT

A system for amplifying a transmitted signal is provided. The system includes a receiver that receives the transmitted signal and generates a conducted signal from the transmitted signal. A non-linear oscillator, such as a synchronous oscillator that is operating in a borderline stable condition, is connected to the receiver. The non-linear oscillator receives the transmitted signal from the receiver and amplifies the transmitted signal without modifying the frequency of the transmitted signal, or its relative phase. The amplification by a non-linear oscillator causes the signal to be amplified relative to the noise, thus improving the signal-to-noise ratio.

19 Claims, 5 Drawing Sheets

SYSTEM AND METHOD FOR AMPLIFYING A CELLULAR RADIO SIGNAL

FIELD OF THE INVENTION

The present invention is generally related to wireless communications, and more particularly to the use of an amplification system to improve the range of reception of a transmitted signal, by improving the receiver sensitivity.

BACKGROUND OF THE INVENTION

Wireless communications systems are well known in the art. In wireless communications systems such as a cellular telephone system, wireless signals are transmitted from a base station to a cellular handset, and from the cellular handset to the base station. The base station and the cellular handset each contain circuitry that allows them to receive the signals transmitted by their system counterpart and to decode data that has been encoded into the transmitted signal.

Typically, a cellular system will include one or more service cells, where each cell has a base station that provides telecommunications services to cellular handsets within the service area. The size of the base station cell will be a function of the range over which the base station may transmit radio signals that may be received by the cellular handsets, and also is a function of the range over which the base station may receive a signal that has been transmitted by a cellular handset. Base stations are generally not power limited, and may amplify signals as required in order to decode data that has been encoded for transmission from the cellular handsets. In contrast, cellular handsets typically are power limited, and can only achieve a limited signal-to-noise ratio without using power at a rate that would be commercially unacceptable.

This constraint on the power requirements for cellular handsets tends to limit the size of the service cell for a base station. This limited size of the service cell in turn requires that an increased number of base stations must be provided in order to provide wireless communications services in the cellular system. Increasing the number of base stations for a cellular system results in significantly increased costs for real estate and equipment. Cellular system operators utilize suitable known methods to help minimize such costs, such as by increasing cell size. Regardless of the known interest in increasing cell size, extremely low-noise amplification of cellular signals at the handset typically results in power losses that are unacceptable, regardless of any potential increase in cell size that may be realized by amplification of such signals.

SUMMARY OF THE INVENTION

Therefore a system and method for amplifying a transmitted signal are required that overcome the known problems and deficiencies of existing systems and methods for amplifying transmitted signals.

In particular, a system and method for amplifying a signal are required that maximize the benefits of amplification while minimizing the power requirements that are required for amplification.

In accordance with the present invention, a system for amplifying a transmitted signal is provided. The system includes a receiver that receives the transmitted signal. A non-linear oscillator, such as a synchronous oscillator that is operating in a borderline stable condition, is connected to the receiver. The non-linear oscillator receives the transmitted signal from the receiver and amplifies the transmitted signal without modifying the phase or frequency of the transmitted signal.

The present invention provides many important technical advantages. One important technical advantage of the present invention is a low-power system for amplifying a transmitted signal that increases the signal relative to the noise. The system of the present invention thus allows transmitted signals that carry data that has been encoded by phase or frequency modulation to be received over a greater service area, without regard to the fact that the amplitude of the signal is not being amplified in a linear fashion.

Present invention also provides a method that allows the service area of a service cell to be significantly increased without a proportionate increase in power required for amplifying transmitted signals. The present invention thus decreases costs for cellular systems by increasing service areas of cells, but does not result in adverse power losses and shortened battery life for cellular handsets.

DETAILED DESCRIPTION OF PREFERRED EMBODIMENTS

Figure 1:
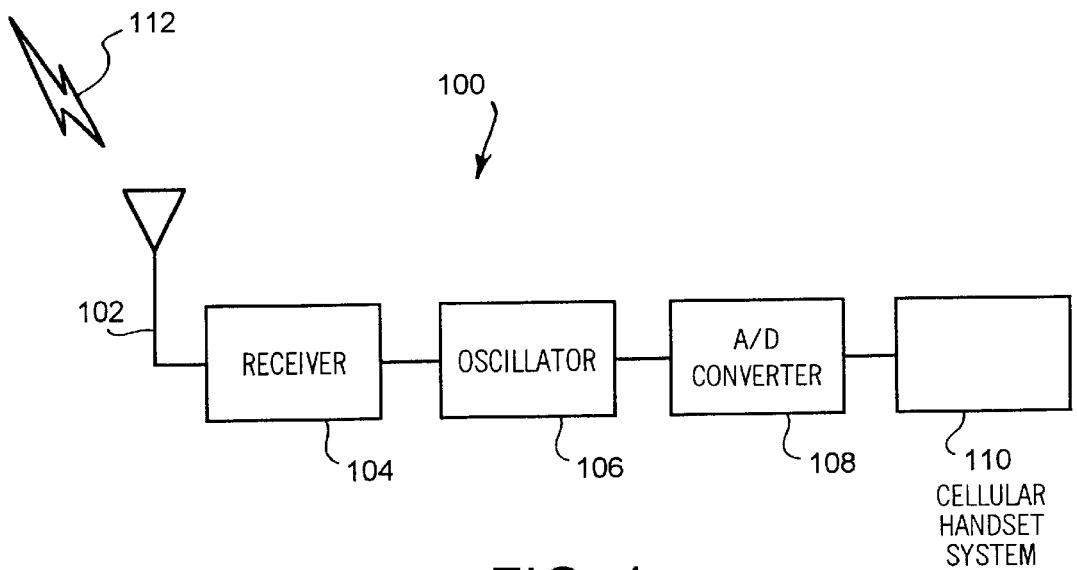
FIG. 1 is a diagram of a system for amplifying a transmitted signal in accordance with an exemplary embodiment of the present invention.

In the description which follows, like parts are marked throughout the specification and drawing with the same reference numerals, respectively. The drawing figures may not be to scale and certain components may be shown in generalized or schematic form and identified by commercial designations in the interest of clarity and conciseness.

FIG. 1 is a diagram of a system 100 for amplifying a transmitted signal in accordance with an exemplary embodiment of the present invention. System 100 allows a transmitted signal to be amplified in a manner that maintains phase and frequency relationships while improving the signal-to-noise ratio, thus allowing the size of a service cell to be increased for cellular communications systems that utilize phase or frequency coding.

System 100 includes antenna 102. Antenna 102 is a suitable antenna such as a cellular handset whip antenna that is configured to receive transmitted radio frequency electromagnetic radiation. The transmitted signal is converted into a conducted signal by antenna 102 and the conducted signal is provided to receiver 104.

Receiver 104 is a wireless communications receiver that is configured to receive the conducted signal and to perform predetermined conversions and amplifications on the signal so as to generate a signal at a frequency that allows the signal to be processed by an analog to digital converter. Receiver 104 may include components such as a broadband filter, a low noise amplifier, a mixer, an intermediate frequency filter, an intermediate frequency amplifier, second mixer, and a channel filter. Receiver 104 receives the transmitted signal from a cellular system counterpart, such as from a base station or from a cellular handset. Receiver 104 then amplifies the signal and filters out signals that do not occur in the signal band of interest. Receiver 104 typically introduces a decrease in signal-to-noise ratio, such as a 6-decibel decrease, of the signal as compared to the signal-to-noise ratio of the signal as it is received at the handset.

Oscillator 106 is coupled to receiver 104. As used in this application, the term "coupled," and cognate terms such as "couple" and "coupling," may refer to a physical connection (e.g. through a soldered connection or a data bus), a logical connection (e.g. through a logical device of a semiconducting component), a virtual connection (e.g. through randomly assigned memory locations of a memory device), a combination of such connections, or other suitable connections. Oscillator 106 is operable to receive the transmitted signal from receiver 104 after receiver 104 has processed the transmitted signal. Oscillator 106 is operable to amplify the transmitted signal in a manner that allows the amplified transmitted signal to be processed by an analog to digital converter so that data may be decoded from the amplified transmitted signal, but which does not require the same amount of power for operation as would a linear low-noise amplification system achieving the same signal-to-noise ratio.

In one exemplary embodiment, oscillator 106 may be a synchronous oscillator, an injection lock oscillator, or other suitable oscillators that normally operate in a semi-stable state. A synchronous oscillator will output a signal that is non-linearly amplified in response to the input signal. For example, a 10% increase in the input to a synchronous oscillator might not result in the same amplification ratio as a 20% increase in the input to the synchronous oscillator. It is possible that the 10% increase may receive a 30% amplification factor, whereas the 20% increase may receive a 20% amplification factor. Nevertheless, the phase and frequency of the signal output by oscillator 106 are undistorted. Thus, oscillator 106 may be used advantageously to amplify a signal from receiver 104 in systems in which the phase or frequency data carries the encoded data.

Oscillator 106 may be switched out of the circuit so as not to receive the signal from receiver 104 when the signal has a high signal to noise ratio. At higher signal to noise ratios, oscillator 106 may spuriously lock on the interfering signal instead of the desired signal, which may result in the desired signal being blocked out.

Oscillator 106 is coupled to analog to digital converter 108. Oscillator 106 transfers the transmitted signal to analog to digital converter 108. Analog to digital converter 108 decodes data that has been encoded in the transmitted signal, such as data that has been encoded using a frequency modulation or phase modulation encoding system or method, and converts the analog encoded data into digital encoded data. This digital encoded data is transferred to cellular handset system 110, which is operable to perform cellular telecommunications processing on the digital encoded data.

Analog to digital converter 108 may be implemented in hardware, software or a combination of hardware and software and may be a semiconductor device with firmware operating systems. Analog to digital converter 108 includes a converter that is operable to detect changes in the frequency or phase or to generate digital data that corresponds to the changes in frequency and phase. For example, analog to digital converter 108 may include a phase demodulation circuit or a frequency demodulation circuit that is used to transform changes in frequency or phase into corresponding changes in voltage. Analog to digital converter 108 then converts these changes in voltage into digital data in the manner previously described or in other suitable manners.

Analog to digital converter 108 is coupled to cellular handset system 110. Cellular handset system 110 may be implemented in hardware, software, or a suitable combination of hardware and software, and may be a cellular telephone application specific integrated circuit. Cellular handset system 110 receives the digital output value data generated by analog to digital converter 108. Cellular handset system 110 is operable to decode the digital data and to generate suitable signals in response to the digital data. For example, voice signals may be converted to digital data and encoded on the transmitted signal using phase or frequency modulation. Cellular handset system 110 is operable to convert the digital data from analog to digital converter 108 back into the voice signals, so that they may be amplified and transmitted to a user. Cellular handset system 110 may also be used to transfer digital data to a digital data modulator-demodulator or other suitable computer interface device, so as to enable a computer to transmit and receive digital data over a wireless system.

In operation, a transmitted signal is received by system 100 and is either converted by analog to digital converter 108 without amplification by oscillator 106, or is amplified by oscillator 106 when the signal to noise ratio of the signal drops below a predetermined value. For example, the signal received at the output of receiver 104 may be less than −110 decibels. For GSM cellular communications systems, the thermal noise level is at −121 decibels and a typical 6dB receiver noise figure makes it effectively −115db, and it may be difficult to maintain signal lock on a signal having a magnitude between −110 decibels and −115 decibels. Therefore, it may be necessary to amplify the signal so that signal lock may be maintained, and so that the data that has been encoded onto the signal may be decoded.

When the signal strength drops below −110 decibels, oscillator 106 may be used to increase the signal strength. Even though oscillator 106 may result in non-linear magnitude amplification, such non-linear amplitude magnification does not distort frequency or phase data. Most importantly the signal is amplified while the noise is not. System 100 may thus be used advantageously in systems such as those using frequency or phase modulation, in which non-linear distortions in amplitude do not result in distortion of the data encoded in the signal.

Figure 2:
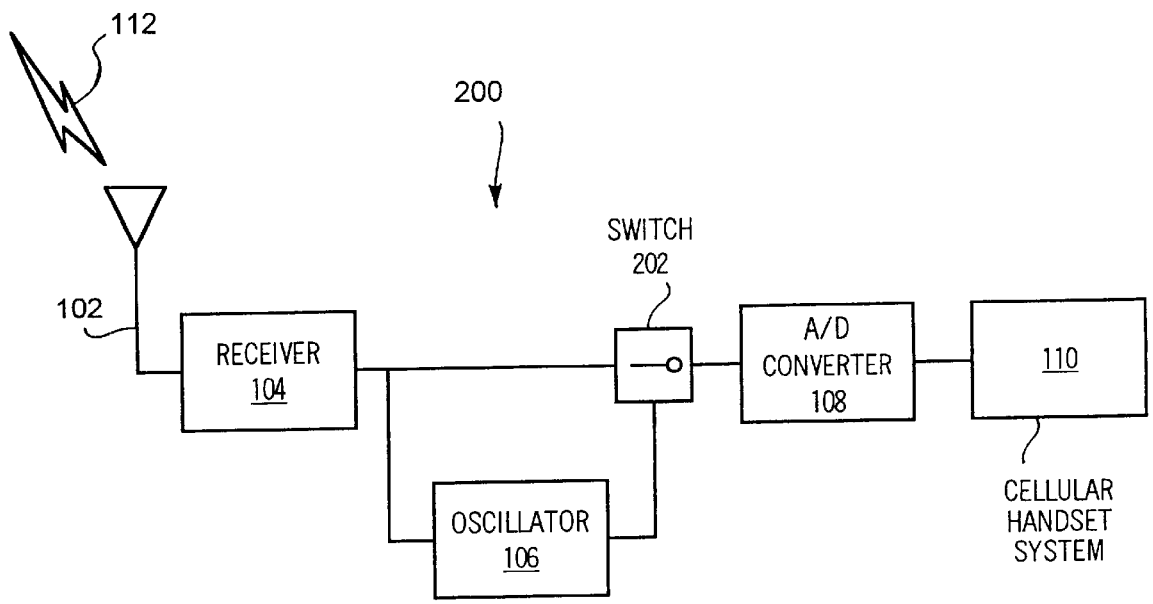
FIG. 2 is a diagram of a system for cellular communications in accordance with an exemplary embodiment of the present invention.

FIG. 2 is a diagram of a system 200 for cellular communications in accordance with an exemplary embodiment of the present invention. System 200 utilizes a switch to remove oscillator 106 from the circuit when it is not required.

System 200 includes switch 202, which is coupled to receiver 104, oscillator 106, and analog to digital converter 108. Switch 202 may be implemented in hardware, software, or suitable combination of hardware and software, and can be an analog switch that is operable to switch oscillator 106 out of the circuit so that receiver 104 is coupled directly to analog to digital converter 108. The position of switch 202 may be controlled in response to the strength of the signal or the transmitted signal received from receiver 104, such that switch 202 bypasses oscillator 106 when the signal strength of the transmitted signal from receiver 104 is greater than −110 decibels. Switch 202 may further place oscillator 106 in the circuit when the signal strength of the transmitted signal from receiver 104 is less than −110 decibels. (The value of −110dB applies to GSM systems but may be different for other frequency modulation or phase modulation systems.)

In this manner, switch 202 provides a signal to analog to digital converter 108 based upon the magnitude of the transmitted signal from receiver 104. If the magnitude is below a predetermined value, additional amplification by oscillator 106 is used to boost the signal relative to the noise. When the magnitude is above the predetermined value, the additional amplification is not required and is bypassed.

In addition, switch 202 may also cause power to the oscillator 106, to be cut off when the oscillator is being bypassed. In this manner, the oscillator does not consume energy when it is not being used, which may result in longer battery life for cellular handsets that utilize system 200.

In operation, system 200 is used to convert a transmitted signal into a conducted signal, and to decode digital data from analog data of the transmitted signal. System 200 provides for additional amplification of the conducted signal in manner that is controlled by switch 202. Switch 202 may be used to bypass the amplifier when the conducted signal strength is greater than a predetermined value, and may also remove power to the amplifier when it is being bypassed so as to conserve power and lower power consumption. When additional amplification relative to the noise is required, switch 202 may be used to couple oscillator 106, into the circuit, and may also cause power to be provided to the oscillator.

Figure 3:
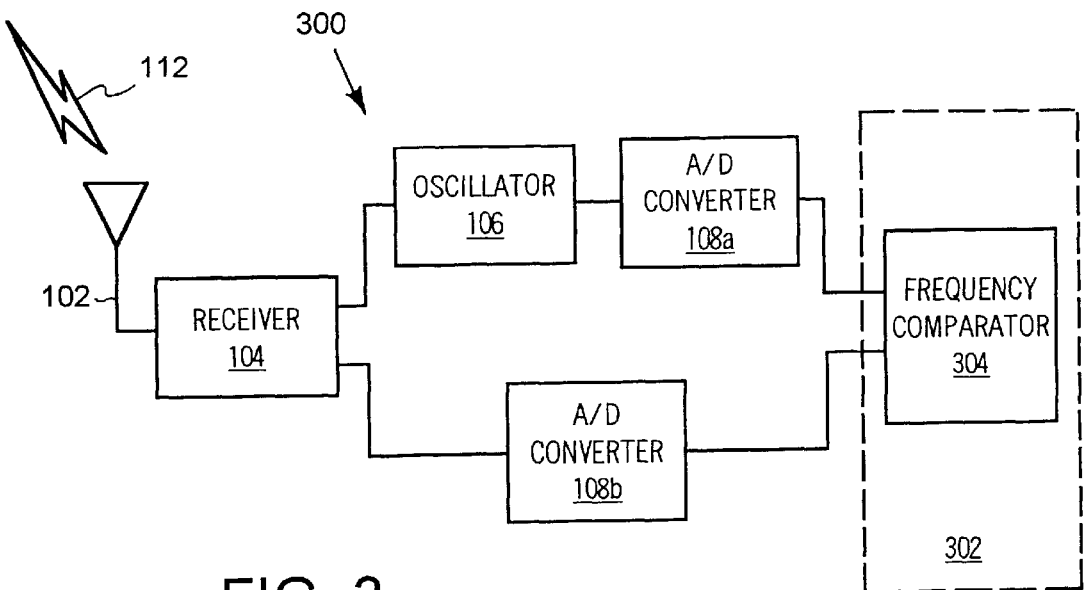
FIG. 3 is a diagram of a system for amplifying transmitted signals in accordance with an exemplary embodiment of the present invention.

FIG. 3 is a diagram of a system 300 for amplifying transmitted signals in accordance with an exemplary embodiment of the present invention. System 300 includes a cellular handset system 302 with comparative functionality that allows an amplified and unamplified signal to be compared so that any distortions created in the amplified signal will not be processed and transmitted to the user in the form of noise.

System 300 includes antenna 102 and receiver 104. Receiver 104 is coupled to oscillator 106 and to analog to digital converter 108b. Oscillator 106 is coupled to analog to digital converter 108a. Analog to digital converters 108a and 108b are coupled to cellular handset system 302. Cellular handset system 302 may be implemented in hardware, software, or a suitable combination of hardware and software, and may be an application specific integrated circuit.

Oscillator 106 receives the transmitted signal from receiver 104 and amplifies the signal. The amplified signal is provided to analog to digital converter 108a which coverts the signal from an analog signal to a digital signal. Analog to digital converter 108b also extracts digital data from the analog data that has been encoded in the unamplified transmitted signal that is received directly from receiver 104.

Cellular handset system 302 includes frequency comparator 306, which is coupled to analog to digital converter 108a and analog to digital converter 108b. Frequency comparator 306 may be implemented in hardware, software, or a suitable combination of hardware and software and can be a circuit system of cellular handset system 302. Frequency comparator 306 compares the frequency of the amplified transmitted signal received from analog to digital converter 108a with the frequency of the unamplified transmitted signal received from analog to digital converter 108b.

For example, the frequency of the amplified transmitted signal may start to diverge from the frequency of the unamplified transmitted signal. In this case, the oscillator 106 may have locked on a noise signal, an interfering signal, or another unwanted signal. The amplified transmitted signal should therefore not be transmitted to the user as it will be predominantly an undesired signal that is of a nuisance value and does not carry communications data. This process may be used when the magnitude of the signal strength of the unamplified transmitted signal drops below a value that would normally allow the cellular handset system 302 to maintain signal lock, and when the amplified transmitted signal is being used. Although the continuous magnitude of the transmitted signal would not be sufficient to support continued communications, the magnitude of the intermittent signal may be sufficient for comparing the frequency of the amplified transmitted signal with the frequency of the transmitted signal.

In operation, a transmitted signal is received by system 300 and is converted into a conducted signal by receiver 104. Oscillator 106 amplifies the conducted signal. The unamplified signal and the amplified signal are both provided to a cellular handset system 302 for subsequent processing. In addition, the phase and/or frequency of the unamplified transmitted signal may be compared with the amplified transmitted signal to determine whether or not the oscillator 106 has locked on a noise signal. Although this phase and frequency comparison has been shown as being incorporated into the cellular handset system 302, it may also or alternatively be provided for prior to analog to digital conversion or at other suitable locations.

Figure 4:
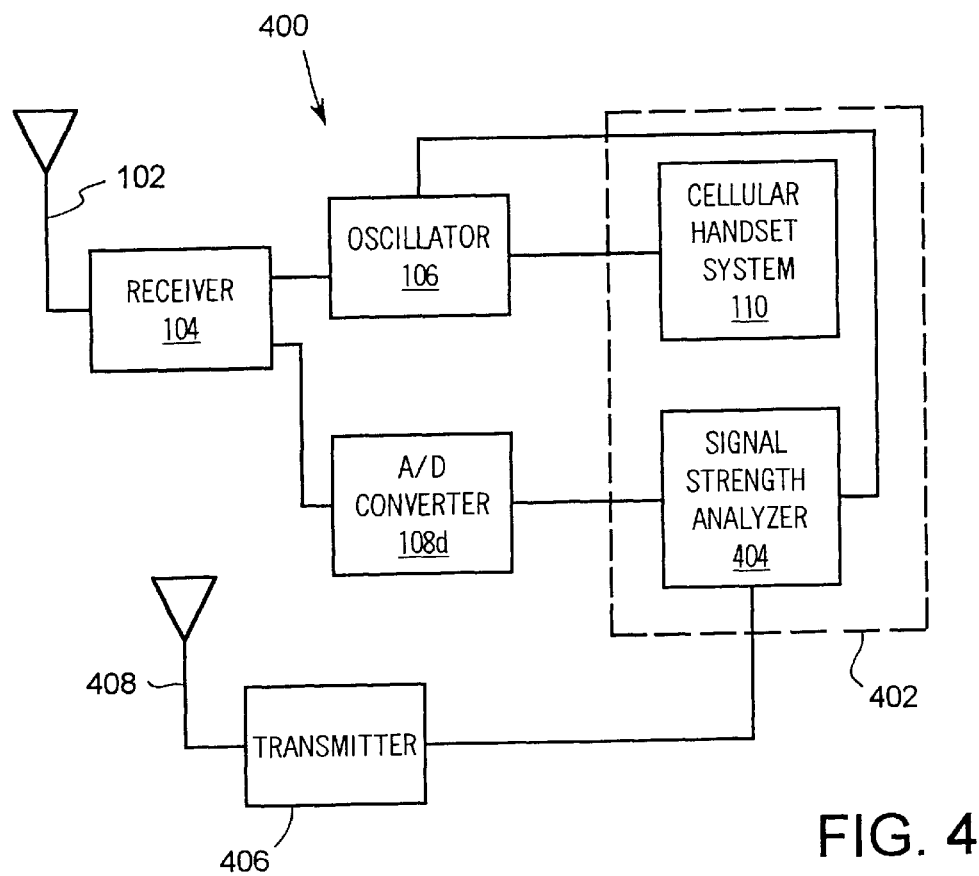
FIG. 4 is a diagram of a system for amplifying a transmitted signal in accordance with an exemplary embodiment of the present invention.

FIG. 4 is a diagram of a system for amplifying a transmitted signal 400 in accordance with an exemplary embodiment of the present invention. System 400 may be used to transmit signal strength data to a base station from a cellular handset that will assist the base station in determining the location of the cellular handset.

System 400 includes cellular handset system 402 and signal strength analyzer 404. Signal strength analyzer 404 may be implemented in hardware, software, or suitable combination of hardware and software, and can be circuit functionality of cellular handset system 402 with firmware components. Signal strength analyzer 404 is operable to receive a signal from analog to digital converter 108 d and to determine the signal strength of the signal. When the signal strength drops below a predetermined value, such as −110 decibels, signal strength analyzer 404 may cause oscillator 106 to turn on, such that the signal received from antenna 102 and receiver 104 is amplified prior to going into cellular handset system 110.

Signal strength analyzer 404 is also coupled to transmitter 406. Signal strength analyzer 404 is operable to transmit signal strength data to the base station, so as to allow the base station to determine the location of the cellular handset from the strength of the signal being received at the cellular handset. For example, it is often desirable to determine the location of a cellular handset within the cellular communications system service area, so as to arrange for handover of service between cells. If the amplified transmitted signal is used to provide this data to the cellular base station, then the location of the cellular handset may be misinterpreted. Signal strength analyzer 404 is fed from receiver 104 and not through oscillator 106 in the exemplary embodiment shown.

Transmitter 406 may be a cellular handset transmitter or other suitable transmitters. Antenna 408 may be a cellular handset transmitter antenna or other suitable antenna, and may be combined with antenna 102 using suitable circuitry for sharing antenna use between a transmitter and a receiver.

In operation, system 400 is used to transmit the signal strength of the transmitted signal to the base station for cellular system control purposes. Signal strength analyzer 404 does not include the amplification of the signal strength by oscillator 106, such that the base station does not receive signal strength data that indicates that the signal strength being received by the cellular handset is stronger than the actual signal strength.

Figure 5:
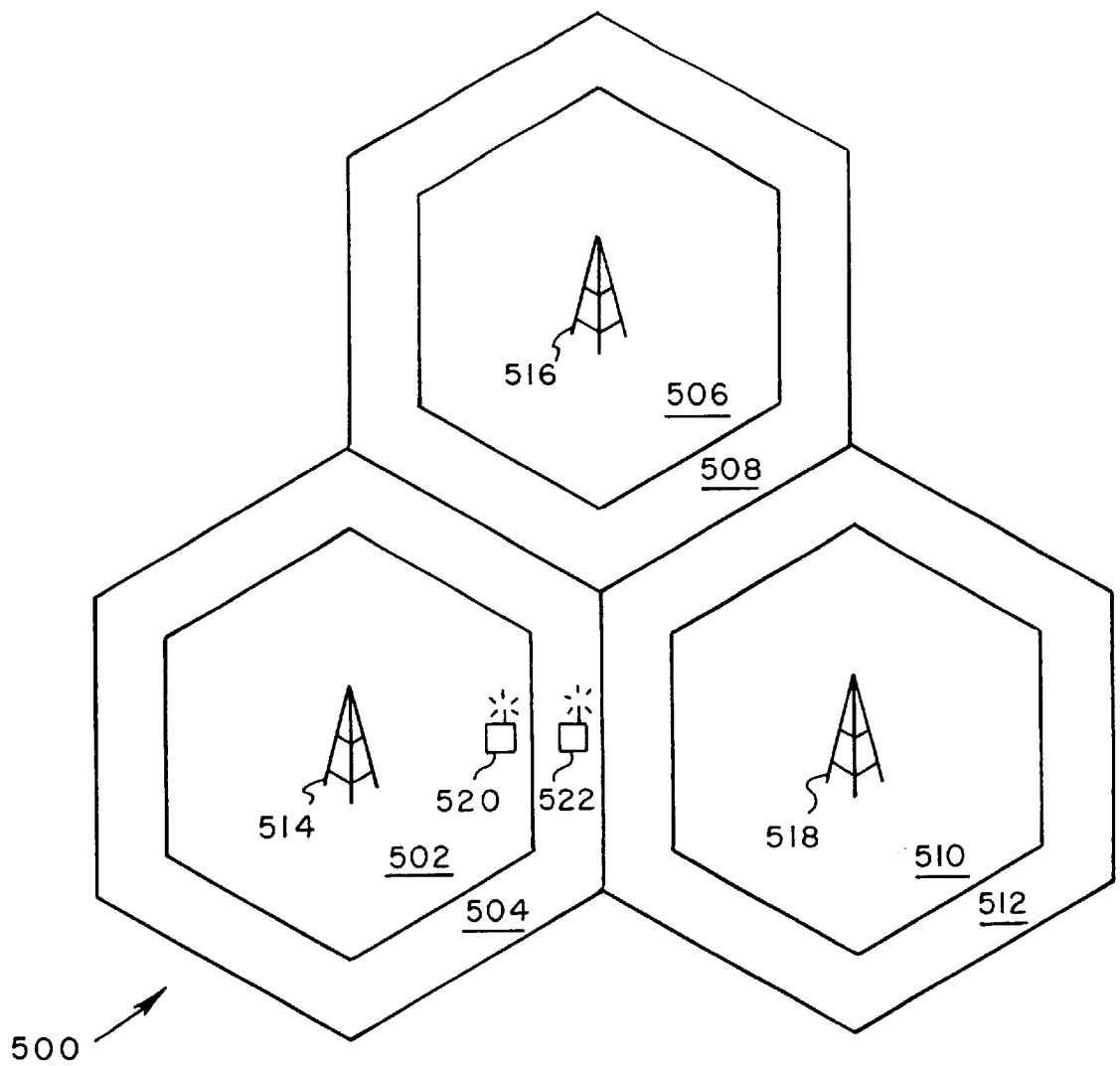
FIG. 5 is a diagram of a cellular system in accordance with an exemplary embodiment of the present invention.

FIG. 5 is a diagram of a cellular system 500 in accordance with an exemplary embodiment of the present invention. Cellular system 500 includes cells that have a service area that further includes an extended service area that utilizes the amplification functionality of the system for amplifying transmitted data of the present invention.

Cellular system 500 includes service cells 502, 506 and 510. Each of service cells 502, 506, and 510 includes an extended service area 504, 508, and 512, respectively. Each service cell 502, 506, and 510 also includes a corresponding base station 514, 516, and 518, respectively.

Each base station 514, 516, 518 is operable to provide telecommunications services to handsets that are located within the corresponding service areas 502, 506, and 510, and extended service areas 504, 508, and 512, respectively. In order to receive service within the extended service areas 504, 508, and 512, the cellular handsets must employ amplification functionality in accordance with the present invention. For example, cellular handset 520 is located within service area 502, and therefore would not require the use of the amplification functionality of the present invention.

In contrast, cellular handset 522 is located within extended service area 504, and would therefore require amplification functionality to be able to communicate with base station 514. Thus, even though a standard cellular handset would be able to communicate with base station 514 when it is located within service area 502, a cellular handset having the amplification functionality of the present invention would be required in order to communicate with base station 514 when it is located in extended service area 504.

In operation, the present invention provides for cellular communications base stations with an extended service areas. The extended service areas of these cellular base stations is dependent on the use of amplification functionality of the cellular system handsets that are used in conjunction with the cellular communications base stations. The extended service area of the cellular communications base stations results in a lower density of cellular communications base stations per unit measure, with a resulting lower installed cost because of lower real estate costs, equipment costs, and other fixed costs. Thus, the present invention allows cellular services to be provided at a lower cost without a corresponding decrease in quality and service. The present invention also allows service to be provided to standard cellular telephone handsets when they are not being used within an extended service area.

Figure 6:
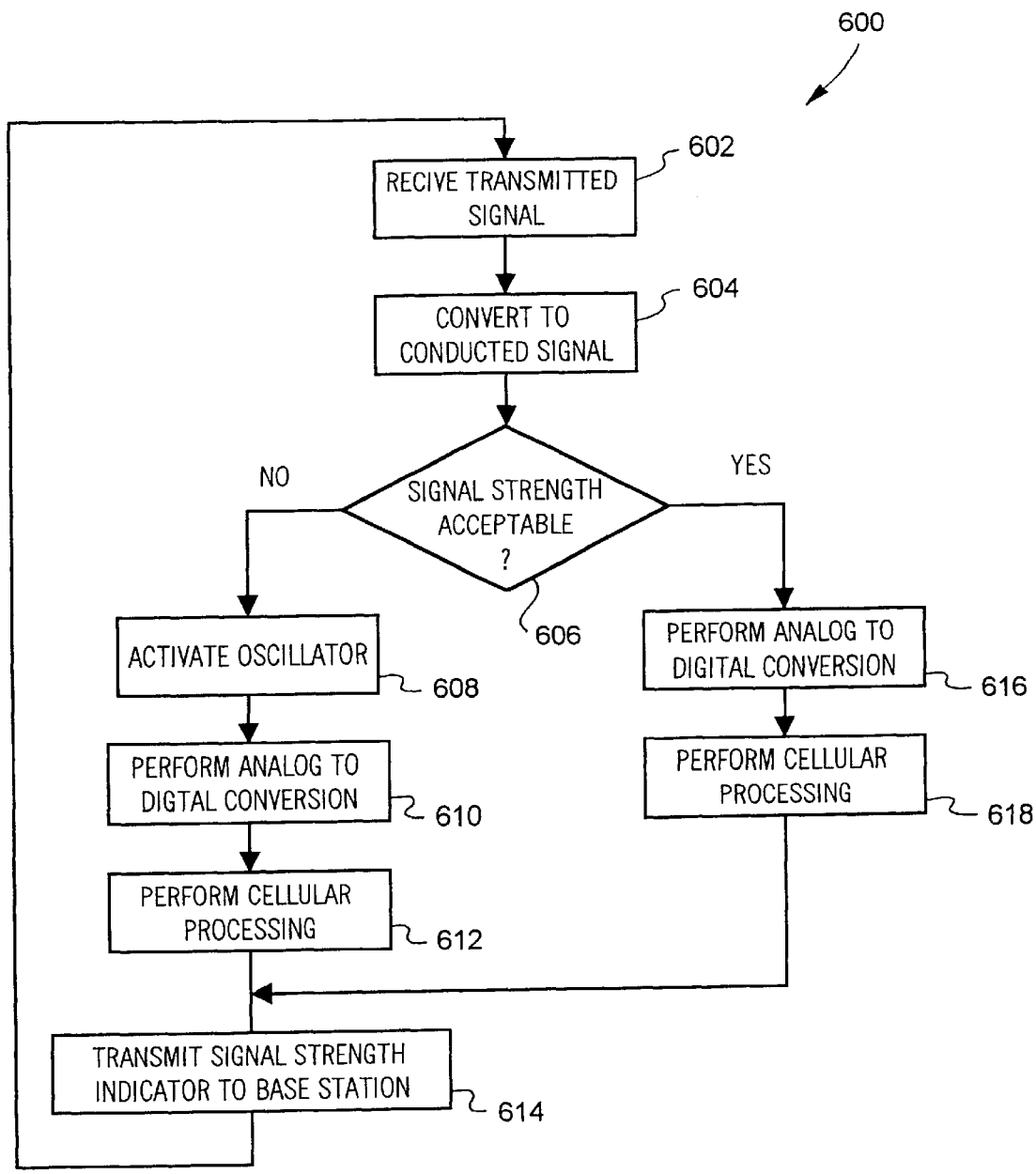
FIG. 6 is a flow chart of a method for processing communications and for amplifying a received signal in accordance with an exemplary embodiment of the present invention.

FIG. 6 is a flow chart of a method 600 for processing communications and for amplifying communications in accordance with an exemplary embodiment of the present invention. Method 600 may be used to amplify a transmitted signal when the signal strength has dropped below a predetermined level.

Method 600 begins at 602 where a transmitted signal is received, such as at an antenna of a cellular handset. The transmitted signal typically includes data that has been encoded by phase modulation, frequency modulation, or another suitable type of modulation. The method then proceeds to 604 where the signal is converted to a conducted signal. The conducted signal may be generated by receiver circuitry of a cellular handset, which may include amplification functionality, frequency-shifting functionality, band filtering functionality, and other suitable signal processing functionality. The method then proceeds to 606 where it is determined whether the signal strength is acceptable. If the signal strength is acceptable, then the method proceeds to 616.

At 616, an analog to digital conversion is performed on the transmitted signal. The analog to digital conversion extracts data that has been encoded in the analog signal and outputs digital data that typically comprises a series of voltage levels representing logical values of "1" or "0." The method then proceeds to 618, where cellular processing is performed on the digital data. The cellular processing is used to extract voice signals, control data, signaling data, and other suitable cellular data from the digital data. The method then proceeds to 614.

If it is determined that the signal strength is not acceptable at 606, then the method proceeds to 608. At 608, an oscillator circuit is activated to amplify the transmitted signal. The oscillator circuit may be a synchronous oscillator, a injection lock oscillator, or other suitable oscillator circuits. The method then proceeds to 610 where analog to digital conversion is performed on the amplified transmittal signal. The method then proceeds to 612.

At 612, cellular processing is performed on the digital signal, such as to extract encoded data. The method then proceeds to 614, where the signal strength indicator data is transmitted to a base station. The signal strength data may be used within the cellular system for system management and control purposes. For example, the signal strength indicator data may be used to determine the location of the cellular handset within the service area or extended service area, for arranging hand-off between service cells, or for other cellular system functionality. The method then returns to 602 where the transmitted signal is received.

In operation, method 600 is used to determine whether to activate an oscillation amplifier of a cellular handset or other communications device within a cellular or wireless communications system.

Figure 7:
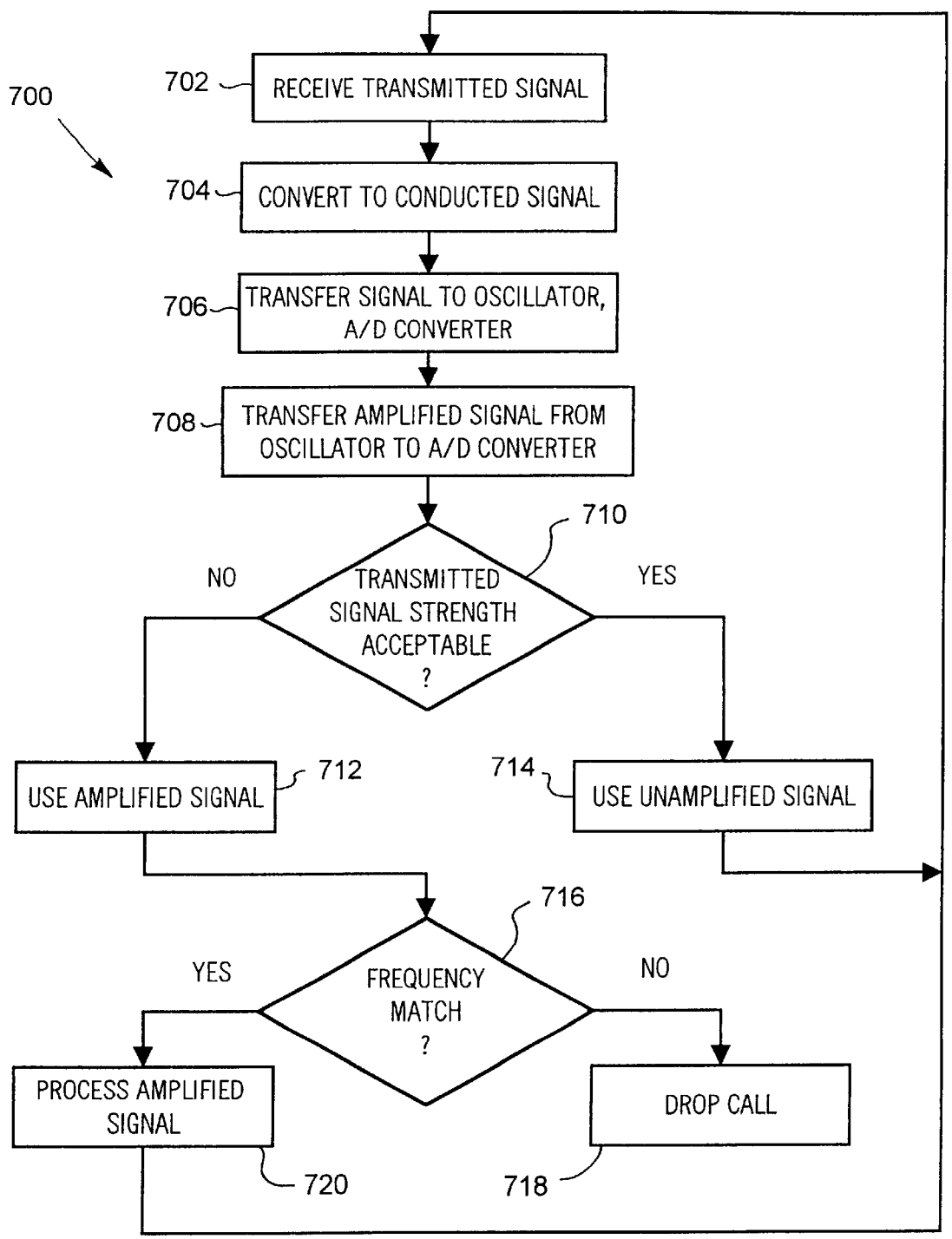
FIG. 7 is a flowchart of a method for selecting between a received signal and an amplified received signal in accordance with an exemplary embodiment of the present invention.

FIG. 7 is a flowchart of a method 700 for selecting between an unamplified transmitted signal and an amplified transmittal signal in accordance with an exemplary embodiment of the present invention. Method 700 may be used to select a suitable signal input for cellular processing, and may also be used to verify that an amplified signal has not drifted or otherwise become corrupted.

Method 700 begins at 702 where a transmitted signal is received. The method then proceeds to 704 where the signal is converted to a conducted signal, such as by receiver functionality of a cellular handset. The method then proceeds to 706.

At 706, the transmitted signal is transferred to an oscillator or other suitable amplifier. In one exemplary embodiment, a synchronous oscillator or a injection lock oscillator may be used. The method then proceeds to 708 where the amplified transmitted signal is transferred from the oscillator or other suitable amplifier to an analog to digital converter. The method then proceeds to 710.

At 710, it is determined whether the signal strength of the transmitted signal is acceptable. For example, it may be determined whether the signal strength of the transmitted signal is less than a predetermined acceptable value. If the transmitted signal strength is determined to be unacceptable, then the method proceeds to 712 where the amplified transmitted signal is selected for use. Otherwise, the method proceeds to 714 and the unamplified transmitted signal is used. The method then returns to 702.

If the amplified signal selected at 710, then the method proceeds from 712 to 716, where it is determined whether a frequency match condition exists. For example, a frequency comparator system of a cellular handset communications system may be used to compare the frequency of an unamplified transmitted signal and an amplified transmitted signal. If it is determined that frequency match exists at 716, then the method proceeds to 720 where the amplified transmitted signal is processed by the cellular handset communications system. Otherwise, the method proceeds to 718 and the call is dropped.

In operation, method 700 is used to select between an unamplified transmitted signal and an amplified transmitted signal for processing in a cellular handset communications system. A transmitted signal is converted to a conducted signal, and is subsequently amplified using an oscillator, such as a synchronous oscillator or a injection lock oscillator. The unamplified transmitted signal and the amplified transmitted signal are then compared, and a suitable signal is selected for cellular processing. If the unamplified transmitted signal strength is acceptable, then the unamplified transmitted signal may be used and processed to extract encoded voice, control, signaling, and other cellular related data that has been encoded into the signal. Otherwise, the amplified transmitted signal is selected for decoding. The frequency of the amplified transmitted signal is also compared with the frequency of the unamplified transmitted signal when the signal strength of the unamplified transmitted signal is acceptable, so as to verify whether the amplified transmitted signal has become locked on a noise signal, interference, or another unacceptable signal.

Although preferred and exemplary embodiments of a system for amplifying a radio transmission signal have been described in detail herein, those skilled in the art will also recognize that various substitutions and modifications may be made to the systems and methods without departing from the scope and spirit of the appended claims.

What is claimed is:

1. A system for amplifying a signal comprising:
   a receiver operable to receive the signal and to generate a transmitted signal from the signal:
   a non-linear oscillator coupled to the receiver; and
   wherein the non-linear oscillator is operable to receive the transmitted signal from the receiver and to amplify the transmitted signal, and the receiver transmits the transmitted signal to the non-linear oscillator when the signal strength of the transmitted signal drops below a predetermined level.

2. The system of claim 1 wherein the non-linear oscillator is a synchronous oscillator.

3. The system of claim 1 wherein the non-linear oscillator is an injection lock oscillator.

4. A system for amplifying a signal comprising:
   a receiver operable to receive the signal and to generate a transmitted signal from the signal;
   anon-linear oscillator coupled to the receiver;
   an analog to digital converter coupled to the non-linear oscillator, the analog to digital converter operable to receive the transmitted signal from the non-linear oscillator and to convert analog data encoded in the transmitted signal into digital data; and
   wherein the non-linear oscillator is operable to receive the transmitted signal from the receiver and to amplify the transmitted signal.

5. The system of claim 4 further comprising a cellular telephone application-specific integrated circuit coupled to the analog to digital converter and the non-linear oscillator, wherein the cellular telephone application-specific integrated circuit is operable to detect when the non-linear oscillator is amplifying the transmitted signal.

6. A system for amplifying a signal comprising:
   a receiver operable to receive the signal and to generate a transmitted signal from the signal;
   a non-linear oscillator coupled to the receiver.
   a bypass switch coupled to the receiver and the non-linear oscillator,
   an analog to digital converter coupled to the bypass switch; and
   wherein the bypass switch is operable to transfer the transmitted signal tom the receiver to the analog to digital converter when the signal strength of the transmitted signal is above a predetermined level, and to transfer the transmitted signal from the non-linear oscillator to the analog to digital converter when the signal strength of the transmitted signal drops below predetermined level, and the non-linear oscillator is operable to receive the transmitted signal from the receiver and to amplify the transmitted signal.

7. A system for amplifying a signal comprising:
   a receiver receiving the signal and generating a transmitted signal from the signal;
   a non-linear oscillator coupled to the receiver;
   a cellular telephone application-specific integrated circuit;
   an analog to digital converter coupled to the receiver and the cellular telephone application-specific integrated circuit,
   another analog to digital converter coupled to the non-linear oscillator and the cellular telephone application-specific integrated circuit; and
   wherein the cellular telephone application-specific integrated circuit is operable to select one of the analog to digital converter and the other analog to digital converted from which to receive the transmitted signal, and the non-linear oscillator receives the transmitted signal from the receiver and amplifies the transmitted signal.

8. The system of claim 7 wherein the cellular telephone application-specific integrated circuit further comprises a frequency comparator, the frequency comparator operable to compare the frequency of the transmitted signal received from the analog to digital converter and the frequency of the transmitted signal received from the other analog to digital converter.

9. A cellular communications systems comprising:
   one or more base stations, each base station operable to transmit one or more encoded signals;

one or more cellular telephone handsets, each cellular telephone handset operable to receive at least one encoded signal from the one or more base stations, each cellular telephone handset comprising an oscillator operable to amplify the received encoded signal when the signal strength of the received encoded signal reaches a predetermined value; and wherein each of the one or more base stations has an associated service area in which the cellular telephone handsets do not utilize the oscillator, and an associated extended service area in which the cellular telephone handsets utilize the oscillator.

10. The cellular communications system of claim 9 wherein each cellular handset further comprises a signal strength system that is operable to transmit signal strength data to the one or more base stations when the cellular handset is operating in the extended service area.

11. The cellular communications system of claim 9 further comprising one or more standard cellular telephone handset, each standard cellular telephone handset operable to receive at least one encoded signal from the one or more base stations.

12. A method for cellular communications comprising:

receiving a transmitted signal;

converting the transmitted signal into a conducted signal; and amplifying the conducted signal with the non-linear oscillator when a signal strength of the conducted signal is less th a predetermined value.

13. The method of claim 12 wherein receiving the transmitted signal comprises receiving the transmitted signal with a cellular telephone.

14. The method of claim 12 wherein amplifying the conducted signal with the non-linear oscillator comprises amplifying the conducted signal with a synchronous oscillator.

15. The method of claim 12 wherein amplifying the conducted signal with the non-linear oscillator comprises amplifying the conducted signal with an injection lock oscillator.

16. The method of claim 12 further comprising transmitting signal strength data to a base station when the conducted signal is being amplified with the non-linear oscillator.

17. A method for cellular communications comprising:

receiving a transmitted signal;

converting the transmitted signal into a conducted signal;

amplifying the conducted signal with a non-linear oscillator;

comparing a frequency of the amplified signal with a frequency of the conducted signal to determine whether a frequency match condition exists; and using the amplified signal if the frequency match condition exists.

18. A method for cellular communications comprising:

receiving a transmitted signal;

converting the transmitted signal into a conducted signal;

amplifying the conducted signal with a non-linear oscillator:

performing an analog-to-digital conversion of the conducted signal;

performing an analog-to-digital conversion of the amplified signal; and comparing the frequency of the digital amplified signal with a frequency of the digital conducted signal to determine whether a frequency match condition exists.

19. The system of claim 18 wherein the transmitted signal is received at a cellular telephone.

* * * * *

UNITED STATES PATENT AND TRADEMARK OFFICE
CERTIFICATE OF CORRECTION

PATENT NO. : 6,529,712 B1
DATED : Domino et al.
INVENTOR(S) : March 4, 2003

It is certified that error appears in the above-identified patent and that said Letters Patent is hereby corrected as shown below:

Title page,
After "*Assistant Examiner*" please add:

Item -- [74] *Attorney, Agent, or Firm*—Christopher J. Rourk, Akin Gump Strauss Hauer & Feld, LLP. --

Column 10,
Line 4, replace "anon-linear", with -- a non-linear --.

Column 11,
Line 28, replace "th", with -- than --.

Signed and Sealed this

Third Day of August, 2004

JON W. DUDAS
*Acting Director of the United States Patent and Trademark Office*